United States Patent [19]

Jeter

[11] 4,034,833

[45] July 12, 1977

[54] ROLLER CLUTCH

[75] Inventor: John Doise Jeter, Iowa Park, Tex.

[73] Assignee: Texas Dynamatics, Inc., Dallas, Tex.

[21] Appl. No.: 631,864

[22] Filed: Nov. 14, 1975

Related U.S. Application Data

[63] Continuation of Ser. No. 490,810, July 22, 1974, abandoned.

[51] Int. Cl.$^2$ .......................................... F16D 3/34
[52] U.S. Cl. ................................ 192/45; 188/82.84
[58] Field of Search ................... 192/45; 188/82.84

[56] References Cited

U.S. PATENT DOCUMENTS

| | | | |
|---|---|---|---|
| 422,025 | 2/1890 | MacDonald | 192/45 |
| 2,561,745 | 7/1951 | Lerch | 192/45 X |
| 2,567,043 | 9/1951 | Wemp | 192/45 UX |
| 2,718,948 | 9/1955 | Roman | 192/45 |
| 3,269,199 | 8/1966 | Deehan et al. | 188/82.84 X |
| 3,958,678 | 5/1976 | Jeter | 192/45 X |

*Primary Examiner*—Samuel Scott
*Assistant Examiner*—Lance W. Chandler

[57] ABSTRACT

A clutch is provided to grip a body having a smooth cylindrical surface such that if the body moves relative to the clutch it is urged to do so with a predetermined relationship between the axial movement and the rotational movement. By rotating the clutch relative to the cylindrical body, the body is urged to move in a direction of its cylindrical axis. Similarly, if the clutch is moved axially relative to the cylindrical body, the body is urged to rotate. The clutch contains rolling elements and performs much as the conventional anti-friction circulating ball lead screw found on automotive steering gear devices but no spiral groove is needed on the cylindrical body. In addition to the obvious advantages of dispensing with the spiral groove on the cylindrical body, the structure can readily be adapted to one-way clutching action. Alternately, the clutch is provided with means to selectively permit over-running in either, neither or both directions of axial and rotary motion of the cylindrical body. Clutching action can also be provided that is proportional to an external force applied to an optional element of the device.

22 Claims, 21 Drawing Figures

ROLLER CLUTCH

This is a continuation of application Ser. No. 490,810, filed 7-22-74, now abandoned.

The familiar means for providing thrust to a first member with a relatively rotating cooperating second member is typified by the threaded rod with matching nut. Forms of screw jacks with balls filling the space between juxtaposed spiral grooves in a male and female member with means to return balls progressing along the cooperating spiral grooves from one end of the shorter spiral to the other are well known. In many applications, however, it is undesirable to put spiral grooves in the surface of the longer member. The cost of putting spiral grooves in the one member is one objection, but in many cases the existence of the spirals on the male member is highly undesirable. Drill tubes, for instance, used for boring holes in the earth are usually provided in sections to be assembled end-to-end by threaded connections to form long continuous drill strings as the string is inserted into earth bore holes. If spirals exist on the outside of such drill tubes, the spiral groove or grooves will seldom be in registry at the connection so that a female cooperating member moving axially and engaging the spiral grooves will have problems negotiating the connections.

It is desirable to urge bodies having smooth cylindrical surfaces to move axially by means acting directly upon the surface but not being clamped thereto. It is also desirable to be able to cause a predetermined relationship between the rotation and axial motion of a cylindrical body relative to a cooperating element.

By appropriately shaping recesses that guide rolling elements in the space between a cylindrical body and a clutching device, the rollers can be urged to roll in a particular direction relative to the body surface and to urge the body surface to move, if it moves, in such a manner that the rollers roll between the surface of the body and the surface of a cooperating member in the direction dictated by the shapes of the recess or recesses; therefore, It is an object of this invention to provide a device that will cause a body having a smooth cylindrical surface to move, if it moves, with a preselected relationship between its rotational motion and its axial motion.

It is another object of this invention to provide a device to urge a cylindrical body, tending to rotate relative to the device, to move axially a predetermined amount per rotation.

It is another object of this invention to provide a device to urge a cylindrical body tending to move axially relative to the apparatus to rotate.

It is another object of this invention to provide a circulating roller device to clutch a cylindrical surface to induce the surface to move in a predetermined direction, the rollers being controlled for uniform gripping of the cylindrical surface by the rollers.

It is another object of this invention to provide a device engaging a cylindrical body with rolling elements that may be selectively actuated to control the rolling elements such that they will not clutch the cylindrical body.

It is another object of this invention to provide a device for engaging a cylindrical body with rolling elements that may be selectively actuated to clutch the body if it is moving in one direction and not clutch the body if it is moving in another direction.

It is another object of this invention to provide a device for clutching a body having a cylindrical surface to urge the body to move, if it moves, relative to the device, with a selectively variable relationship between the axial motion and rotary motion, said relationship being established by means to change and position the path of movement of rolling elements in contact with the cylindrical surface.

These and other objects, advantages, and features of this invention will be apparent to those skilled in the art from a consideration of this specification, including the attached drawings and appended claims.

BRIEF DESCRIPTION OF DRAWINGS

In the drawings, wherein like reference characters are used throughout to designate like parts.

DETAILED DESCRIPTION OF DRAWINGS

In accordance with the device of this invention, means are provided for causing a body having a cylindric surface to move axially if it rotates about the cylindrical axis, relative to the device, and to urge the body to rotate about its axis if it moves axially relative to the device. Such action is described as urging a body, if it moves, to move with a predetermined relationship between its axial motion and its rotary motion relative to the device.

My copending application for a Roller Clutch, application number 456,623 filed Apr. 1, 1974, now U.S. Pat. No. 3,958,678, pertains to a clutch for preventing the relative rotation of a body having a cylindrical surface as the body moves in the direction of the axis of the cylindrical surface. This application pertains to a device for inducing or urging rotational movement of a body having a cylindrical surface as the body moves axially or is urged to move axially relative to the device.

Figure 1:
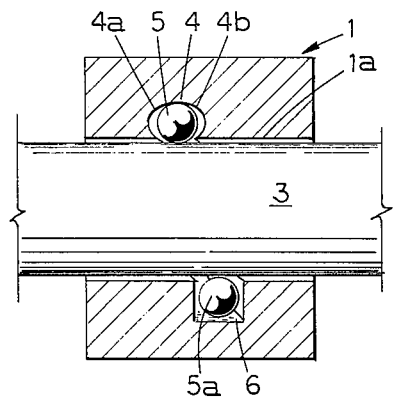
FIG. 1 is a longitudinal sectional view of a device of this invention.

In the embodiment shown in FIG. 1, housing 1 has opening 1a through which cylindrical body 3 extends. Within opening 1a recess 4 (at least one) extends in a spiral about the axis of body 3. A complement of rollers, here shown as balls, one shown as 5, fill and are free to roll along the longitudinal dimension of recess 4. A duct 6 communicates balls from one end of helical recess 4 to the other. The contour of recess 4 as viewed in FIG. 1 is shaped such that if ball 5 moves in either axial direction it will be pinched between a recess surface 4a or 4b and the surface of body 3. If the body tends to move axially urging the ball farther into the pinch, the pinch load will increase. If the body is rotated without axial motion, the ball 5 will move in a peripheral direction relative to the housing within the helical recess. This peripheral movement will again bring the ball into a pinch area 4a and induce a compressive load on the ball between the surface of the recess and the surface of the body. The ball, then, to be free to move, must move along the recess in a helical direction and this urges the body, if it moves, to move with predetermined relationship between axial and rotary motion.

As shown in FIG. 1, recess 4 and duct 6 constitute one full circle around body 3. Duct 6 extends in the axial direction opposite that of helix 4. Balls, one shown as 5a in duct 6, do not grip body 3 because duct 6 has no pinch contour. It is pointed out that a plurality of recesses and ducts in series may be used to traverse the periphery of the body. Each duct may then conduct rollers from one recess to the other or return the rollers to opposite ends of the same recess. If available space permits, recess 4 can extend for a plurality of turns around body 3 in which case duct 6 will describe a path radially farther outward from recess 4 to extend from one end of recess 4 to the other.

Figure 2:
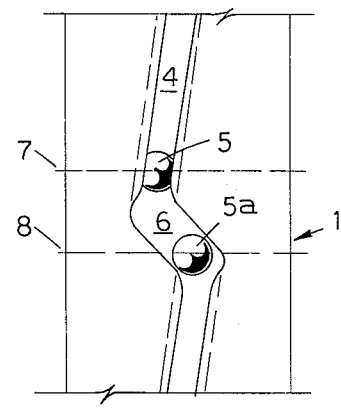
FIG. 2 is a view of a development of the inner surface of bore 1a of the device of FIG. 1.

A development of the surface of opening 1a as viewed from the centerline of body 3 radially outward is shown in FIG. 2. A dotted line 7 shows the location of the plane cutting the top of FIG. 1. A dotted line 8 shows the location of the plane cutting the bottom half of FIG. 1.

Figure 3:
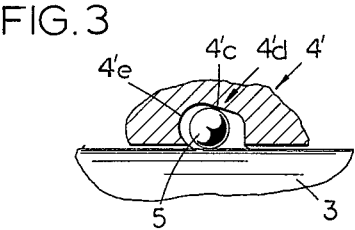
FIG. 3 is a sectional view of an alternate form of a ball recess for use in the device of FIG. 1.

FIG. 3 shows an alternate recess contour in outer housing 4' which is to be used with the device of FIG. 1 to cause a one-way clutching action. If body 3 moves left, roller 5, shown here as a ball, will move within recess 4'c, away from pinch surface 4'd against abutment 4'e. With ball 5 against abutment 4'e, the contour of the recess clears the ball such that it will not pinch against the surface of body 3. With all the balls in the recess against abutment 4'e, body 3 may move left and rotate in either direction. If body 3 moves right it causes ball 5 to move into pinch zone 4'd with the results described in conjunction with FIG. 1. Recess 4'c may be reversed, of course, to permit overrunning as body 3 moves right, clutching the body as it tends to move left.

Figure 4:
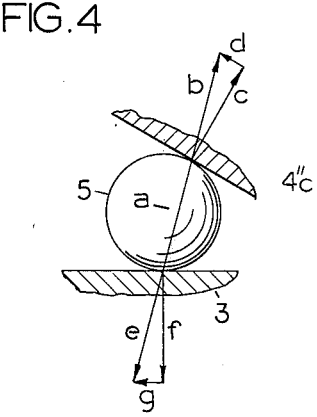
FIG. 4 is a schematic showing the direction of loading forces on a ball in a device of this invention.

FIG. 4 represents a typical ball as pinched between the surface of a cylindrical body and the surface of a recess such as 4b of FIG. 1. The ball 5 is compressively loaded between two points along line a. The load vector b is imposed on the surface 4"c of the recess. Vector b can be resolved into vector c perpendicular to the recess surface and vector d parallel to the surface of the recess. If the angle of surface 4"c relative to the surface of body 3 is such that vector d is smaller than the friction force consisting of the product of the scalar value of vector c and the coefficient of friction between the surfaces in contact, the ball will not move out of the pinch area and clutching action will be accomplished.

Vector e of FIG. 4 represents the compressive load applied to the surface of body 3. If surface 4"c represents a helix about the centerline of body 3, vector e will not pass through the centerline of body 3. Vector e can be resolved in this case into vector f lying in a plane transverse the axis of body 3 and vector g lying in a plane containing the axis of body 3. Vector f will miss the axis of body 3 and produce a torque tending to rotate body 3 about its axis, the torque value being a product of the scalar value of vector f and the distance between the axis of body 3 and the line of action of vector f. It is seen then from the foregoing that if body 3, situated as shown in FIG. 4, is urged right the compressive load on the ball will increase and all load vectors shown will increase in scale value and the torque applied to body 3 through the action of vector f will increase. It follows that for body 3 to move relative to surface 4"c without changing the scalar values of the vectors shown, it must rotate to allow ball 5 to move longitudinally of the helical surface, thus accomplishing the purpose of the device of this invention.

Figure 11:
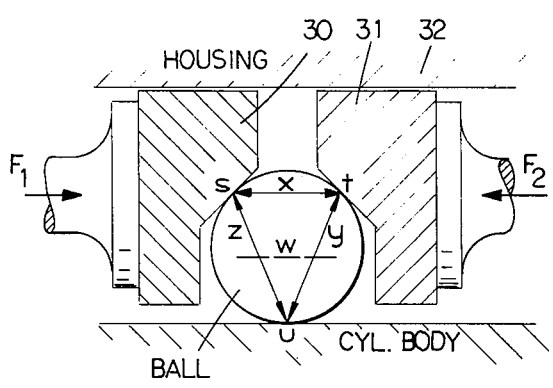
FIG. 11 is a schematic of clutching roller loading characteristics by embodiments of this invention.

The basic action of clutch balls pinched in the diminishing distance between a recess surface and the surface of a cylindrical body has been described in conjunction with FIG. 4. The more elaborate roller controls utilized by embodiments of this invention will now be described. FIG. 11 represents clutching action achieved by recesses that provide three point contact on clutch rollers. Balls are shown. As shown in FIG. 11, three points of contact on the ball eliminates the need for the angle between the recess surface and the cylindrical surface to be designed such that friction will hold the ball in the pinch between the two surfaces. Using appropriately shaped rollers, the points s, t and u may be line contacts, but the result is the same as for balls.

Forces $F_1$ and $F_2$ urge members 30 and 31 toward the ball. The ball touches at points s, t and u. Compressive force vectors x, y and z will exist in the ball. The ball rolling in a direction perpendicular to the plane of the drawing will rotate about line w. The point on the cylindrical surface u will be urged to move in a direction transverse the line w. If points s and t, then, are points on a helical recess, line w will not be parallel the axis of the cylindrical body, hence the cylindrical body is urged to move axially as it rotates.

A primary advantage of the arrangement of the device of FIG. 11 is the ease with which it can be adapted to limited force application. Above a particular angle between lines x and y, the ball will always move out of the pinch between points t and u unless a holding force is applied at point s. The ability of the ball to clutch the cylindrical body is proportional to the forces $F_1$ and $F_2$.

Figure 12:
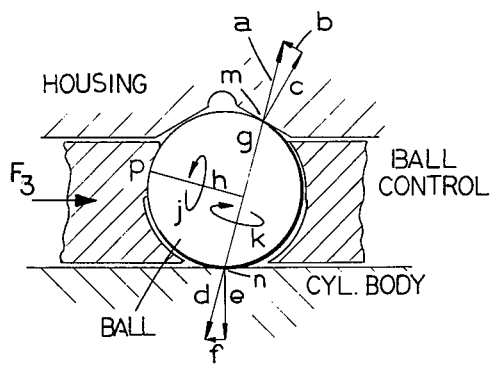
FIG. 12 is a schematic of clutcing ball loading characteristics of embodiments of this invention.

FIG. 12 represents a cylindrical body clutched by an embodiment of the device of this invention. The ball is in contact with the surface of the cylindrical body which is tending to move right. Compressive forces are applied to the ball at point m on the recess and point n on the body. These compressive forces act through line g. If the ball rolls longitudinal of the recess, it tends to spin about line g as shown by arrow k. This contributes nothing to the desired action and invites creep between the housing and body as relative motion occurs. The line h, perpendicular to line g is the desired axis of rotation. The ball should roll about line h as shown by arrow j. To accomplish the spin control needed, a ball control cage is urged by force $F_3$ to the right applying a controlling force to the ball at point p, urging the ball into the pinch and preventing spin about line g.

Figure 5:
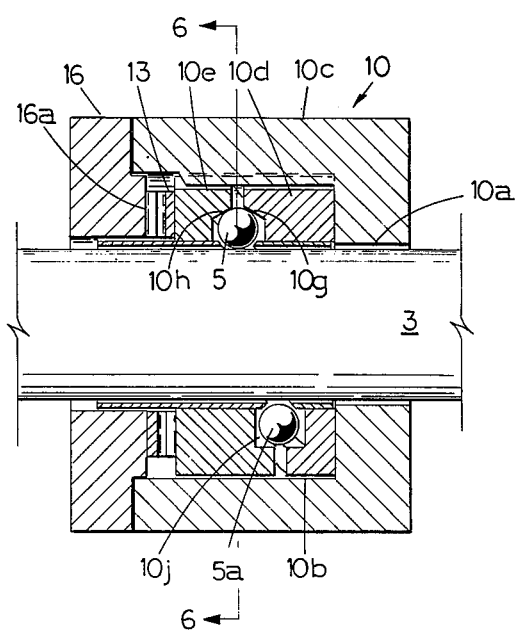
FIG. 5 is a longitudinal sectional view of the preferred embodiment of this invention.

The preferred embodiment of this device is shown in FIG. 5. Body 3 extends through opening 10a in housing 10. Within cavity 10b of the outer housing 10c is situated thrust member 10d. Rotation within the outer housing is prevented by key 10f in keyway 10k. Backup member 10e is situated within cavity 10b and urged toward member 10d by resilient means 13 shown as a wave spring. The wave spring acts against shoulder 16a on closure 16 and urges member 10e to the right. Surface 10g in member 10d cooperates with surface 10h of member 10e to form a recess which extends in a helical direction around body 3. Duct 10j extends from one end of the recess to the other to conduct balls emerging from one end of the recess to the other for re-entry into the recess when the balls are moving therethrough as a result of rotation of body 3.

Member 10e, being urged toward member 10d by spring 13, tends to reduce the size of the recess and brings pinch surface 10h and 10g into contact with the balls represented by ball 5. The ball is urged radially inward against the surface of body 3. Balls in the recess, then, have three points of contact, one point on the surface of body 3. The action of balls pinched in this manner has been described in conjunction with FIG. 11. Duct 10j may be formed by cooperating surface of both member 10d and member 10e, or exist solely in either member, opening into the recess at the ends.

Figure 6:
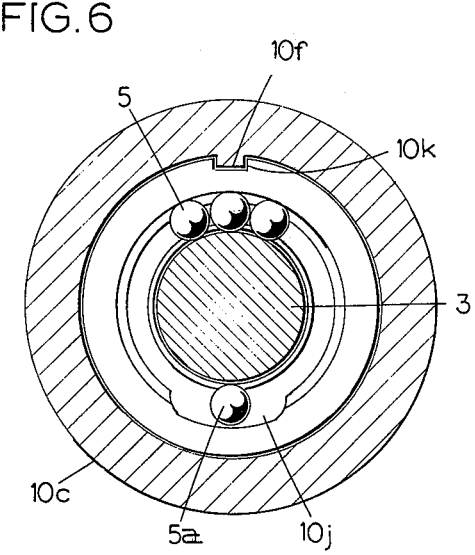
FIG. 6 is a sectional view taken along line 6—6 rotated about the central axis of the device of FIG. 5.

FIG. 6 is produced by cutting the device of FIG. 5 with a radial line extending from the axis of body 3 such that the radial line follows the helix of the recess and the return jog of the duct.

Figure 7:
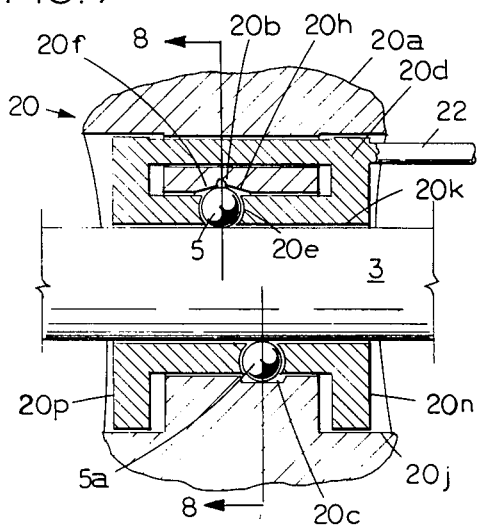
FIG. 7 is a longitudinal sectional view of an alternate embodiment of the device of this invention.
Figure 8:
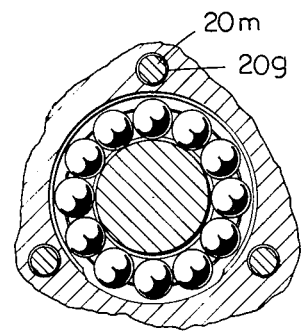
FIG. 8 is a sectional view taken along line 8—8 of FIG. 7.

The device of FIG. 7 provides means to select clutching action options such as no clutching action in either axial direction or rotational direction, clutching action in either one axial direction and clutching action in both axial directions.

Housing 20 has outer housing 20a and inner housing 20d. The inner housing is a ball position control means with opening 20k, through which body 3 extends. Recess 20b on the inside surface of outer housing 20a extends in a direction forming a helix about the centerline of body 3. Duct 20c extends from one end of recess 20b to the other so that a complement of balls, one shown in the recess as 5, and one in the duct as 5a, may circulate through recess and duct. The ball position control means 20d has a slot 20e juxtaposed with recess 20b and duct 20c so that balls moving along recess and duct are also moving along the slot. Control means 20d is axially movable relative to the recess 20b and can urge the balls in an axial direction into contact with either recess pinch area 20f or 20h. With control means 20d urged left, ball 5 will be urged into the pinch area formed by surface 20f and the surface of the body. If the body is urged left, the balls in the recess will pinch the body more tightly, preventing farther movement of body 3 in that direction. Rotation of body 3 will cause the balls to move along the recess to permit the body to move more left or to urge it to move right depending upon the sense of the helix and the direction of rotation of body 3.

If control means 20d is positioned such that the balls are constrained in the center of the recess, the balls cannot reach pinch area 20f or 20h. The balls, then, do not grip the surface of body 3 when it moves in either axial direction or rotational sense.

With the control means urged to the right by action described for the case in which it is urged left, the body may be moved left, but will be clutched by the balls if it moves right. Again, rotation of the clutched body in one direction will permit it to move right a distance per revolution depending upon the helix angle of the recess. Rotation of body 3 in the opposite direction will cause it to move left at the same rate. Ball clutching action is described in detail above in reference to FIG. 12.

Control means 20d is cut into by the slot 20e, and is connected by rods 20m extending from flange 20n to flange 20p and openings 20j through outer housing openings 20g. Three such rods are shown. Axial positioning and movement of the control means is accomplished by link 22 actuated by external forces.

Figure 9:
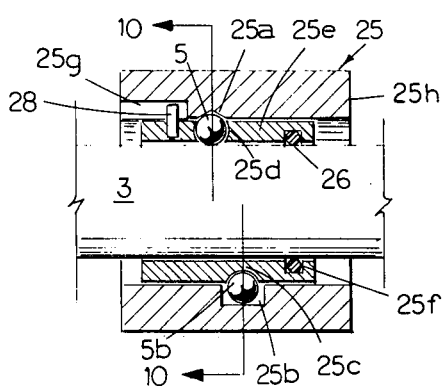
FIG. 9 is a longitudinal sectional view of an alternate embodiment of the device of FIG. 7.
Figure 10:
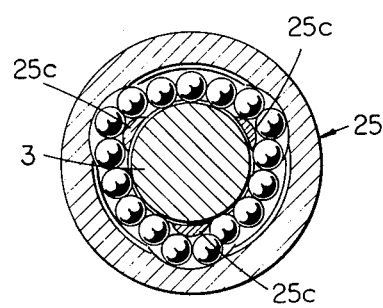
FIG. 10 is a sectional view taken along line 10—10 of FIG. 9.

As shown in FIG. 9, ball control means 25e is not cut into by slot 25d that guides the balls, as was the case with the device of FIG. 7. Three helical clutch recesses 25a and three helical ducts 25b in outer housing 25h comprise one turn about the periphery of body 3. In the area of duct recess 25b, balls 5b are moved radially outward from the surface of body 3 so that control webs 25c can hold the two ends of control 25e together. A drag means 26 to urge the control to move in the direction body 3 moves is shown as "O" ring 26 in groove 25f. Rotation of control 25 is prevented by pin 28 affixed to the ball control and axially slidable in groove 25g of the housing. The effect of moving the control left or right has been described in reference to the device of FIG. 7. The control, or course, can be controlled by external forces by appropriate linkages as is the device of FIG. 7.

Figure 13:
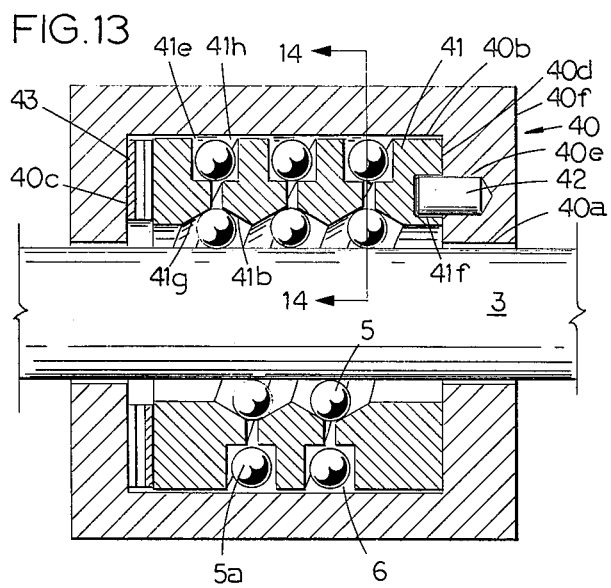
FIG. 13 is a longitudinal sectional view of an alternate embodiment of this invention utilizing spiral, multi-turn roller loading means.
Figure 14:
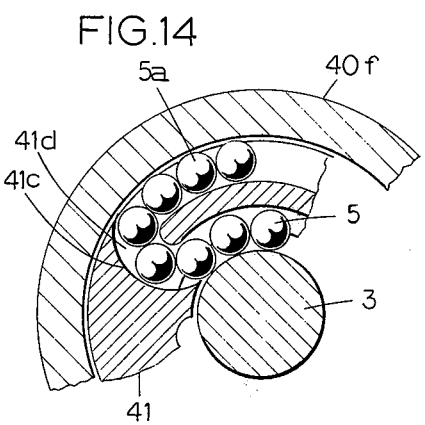
FIG. 14 is a sectional view taken along line 14—14 of FIG. 13.

The apparatus of FIG. 13 represents a clutch with means to use a helical coil or a plurality of coils to form the recess opening toward the clutched cylindrical surface and to form, at least in part, the ducts to communicate balls between opposite ends of the recess. Housing 40 has outer housing 40f with opening 40a through which body 3 extends and cavity 40b in which coil 41 is disposed generally coaxial with body 3. Coil 41 is formed, at least in part, of wire loops having contour 41b cooperating with a similar contour 41g in adjacent loops to form recesses extending in a helical path about the surface of body 3. As shown in FIG. 13, when balls moving along the recess reach a point where it is desirable to transfer them to the opposite end of the recess, an opening 41d is provided between the wires so that the balls move in a generally radial outward direction guided by arcuate shape 41c into duct 6. Duct 6 is formed by contours 41e and 41h in adjacent wire loops and the outer side wall of opening 40b. The balls thus move in a helical path along the duct to the opposite end of the recess where another radially extending opening and arcuate guide causes the balls to move radially inward to again enter the recess. Preferably, coil 41 will have an inherent shape such that it must extend axially to increase the size of recess formed between adjacent contours 41b and 41g to accommodate the balls 5 between the surface of the recess and the surface of body 3. The tendency of coil 41 to spring back to its initial length will cause the individual wire loops to squeeze the balls in the recess radially inward against the surface of body 3. This feature not only provides a preload on the balls but offers means to limit the loads the balls may apply to the clutch body 3. A preloaded but load limited clutch may thus be economically constructed.

In FIG. 13, the coil is constrained against axial motion, beyond certain limits of backlash, by abutment 40c and 40d in cavity 40b. Resilient means is optionally provided by wave spring 43 to augment the forces applied by coil 41. Rotation of the coil relative to the housing is prevented by pin 42 in hole 40e of the housing and hole 41f of the coil.

Figure 15:
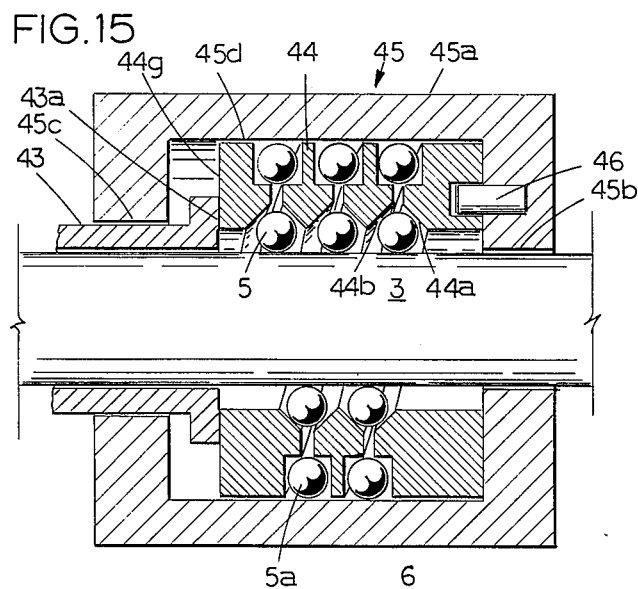
FIG. 15 is a longitudinal sectional view of an alternate embodiment of the device of FIG. 13.

The device of FIG. 15 represents a modified form of the clutch of FIG. 13. Axially movable actuator element 43 is situated around body 3 to apply force by abutment 43a to the end 44g of coil 44. Element 43 is guided by bore 45c in the outer housing 45a. By urging element 43 right by any suitable external force, the spacing between coil loops tends to be reduced, urging balls 5 against the surface of body 3 with a force proportional to the axial force applied to the coil by element 43. By shaping the coil 44 and cooperating recess contours 44a and 44b, the balls may be free of load against the surface of body 3, unless the coil is compressed by force applied by element 43. Body 3 can then move in any axial and rotational direction relative to the coil until element 43 is moved right to compress the coil to urge the balls into contact with the surface of body 3. The clutching action of the balls will be proportional to the loads applied to coil 44 by member 43. Pin 46 prevents relative rotation between coil 44 and outer housing 45a.

It should be noted that the coils of FIG. 13 and FIG. 15 may be plural element coils with the recesses between coils being connected by means to move rollers through all recesses in series. Alternately, the recesses may be independent of other recesses with rollers being communicated between opposite ends of the same recess in which case the plurality of rollers or balls will operate as a plurality of independent groups.

Figure 16:
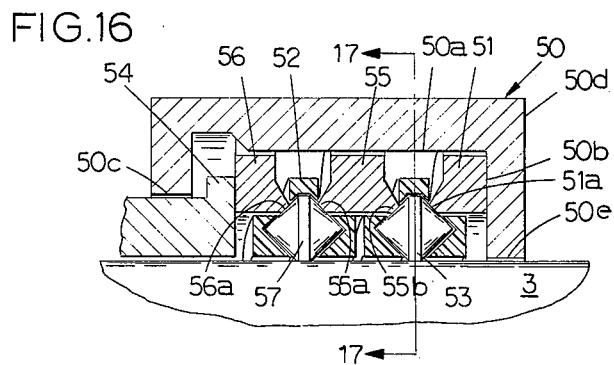
FIG. 16 is a longitudinal sectional view of an alternate embodiment of this invention.
Figure 17:
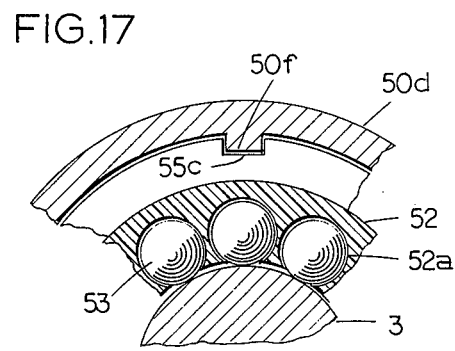
FIG. 17 is a sectional view taken along lines 17—17 of FIG. 16.

FIG. 16 represents a clutch utilizing rollers other than balls to grip the cylindrical body. One side only is shown. Helical clutching recesses are employed connected end-to-end by ducts which jog axially along the periphery of the body the same amount and in opposite direction as the helix. A plurality of helix and duct spans may be used in series to make one turn around the periphery of body 3. Two side-by-side roller sets are shown . . . any number may be used.

Each complement of rollers is imbedded within a flexible roller conductor belt 52 which moves along recesses and ducts with the rollers to prevent misalignment of rollers after they negotiate the duct between recess ends and to space the rollers apart to prevent mutual interference. The rollers shown have cylindrical mid-sections which roll on the cylindrical surface of the body and conical ends to roll in the recess so that the rollers are urged toward the body when the recesses are reduced in axial dimension. The helix angle and the shape of the roller mid-section may be related such that the roller has line contact with the body.

In cavity 50a of outer housing 50 is situated thrust ring 51, dual sided thrust ring 55 and thrust ring 56. Clutch actuator 54 is situated around body 3 and extends through bore 50c in the outer housing. When actuator 54 is urged right, thrust ring 56 is urged right. Conical surface 56a contacts the conical surface of roller 57 and urges the roller both to the right and radially inward. Roller 57, being urged right, applies compressive load to conical surface 55a of the dual sided thrust ring 55, urging it to the right. Ring 55, in turn, applies compressive load to the conical surface of roller 53 by way of conical surface 55b. Roller 53 is urged right to apply compressive loads to the right conical surface 51a of thrust ring 51. Finally, thrust ring 51 abuts shoulder 50b of the outer housing and is constrained against axial motion. Key 50f prevents rotation of the thrust rings by engaging a slot in each ring, one shown as 55c.

Figure 18:
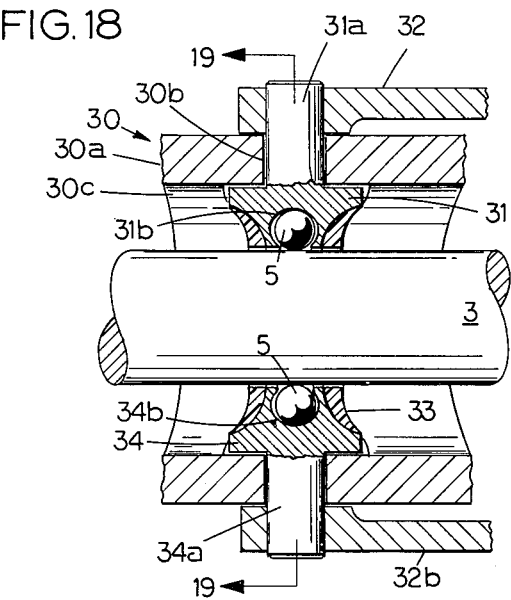
FIG. 18 is a longitudinal sectional view of an alternate embodiment of this invention for varying the relationship between axial and rotational movement of the clutched cylindrical body.
Figure 19:
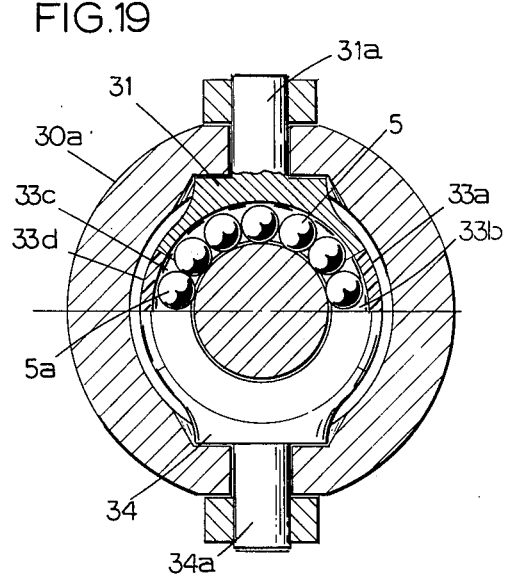
FIG. 19 is a sectional view taken along line 19—19 of FIG. 18.

The device of FIG. 18 provides means to adjust the angle of the helix along which ball roll when clutching body 3. The helix angle can be adjusted both left and right hand and can be zero. Recess bearing element 31 is rotatable on shaft 31a extending radially through bearing bore 30b of outer housing 30a. Lever 32 is attached to the shaft and may be moved and positioned by means (not shown) external to the device. Arcuate opening 31b, when positioned as shown, extends in a peripheral direction about body 3. Diametrically opposite element 31 is a second such element 34 similarly situated in outer housing 30. Elastomeric strain members 33a and 33d are situated in the gap between the ends of the arcuate portions of the two elements. The elastomeric material is shown bonded to elements 31 and 34 noted as 33. Members 33a and 33d have openings extending from recess 31b of one element to the adjacent recess in the opposite element 34. Balls 5, then, moving along the recess in one element, may move through the duct 33c or 33b of the elastomeric members into the recess of the opposite element and thus circulate through both ducts continuously as long as body 3 rotates. When member 32 is moved, member 32b is moved in the opposite direction such that shaft 31a and 34a will rotate the same amount in opposite directions. The strain members 33a and 33d will strain to still provide a continuous duct for movement of balls. With the elements 31 and 34 angled relative to a plane transverse the axis of body 3, rotation of body 3 will cause balls rolling in recess 31b to tend to roll with a component of motion in an axial direction relative to body 3. As body 3 rotates, then, it will tend to move axially with the axial distance moved for each rotation proportional to the angle recesses 31b and 34b make with a plane transverse the axis of body 3. As the angle between planes containing arcuate recesses 31b and 34b and the axis of shaft 31a and 34a increases relative to a plane perpendicular to the axis of body 3, the effective radius of body 3 increases near the ends of the elements. These ends may be considered cantilever extensions of the related elements 31 and 34 and, as such, are shaped to strain radially outward from body 3 so that compressive loads on balls traversing the recesses near the ends are within acceptable limits.

Figure 20:
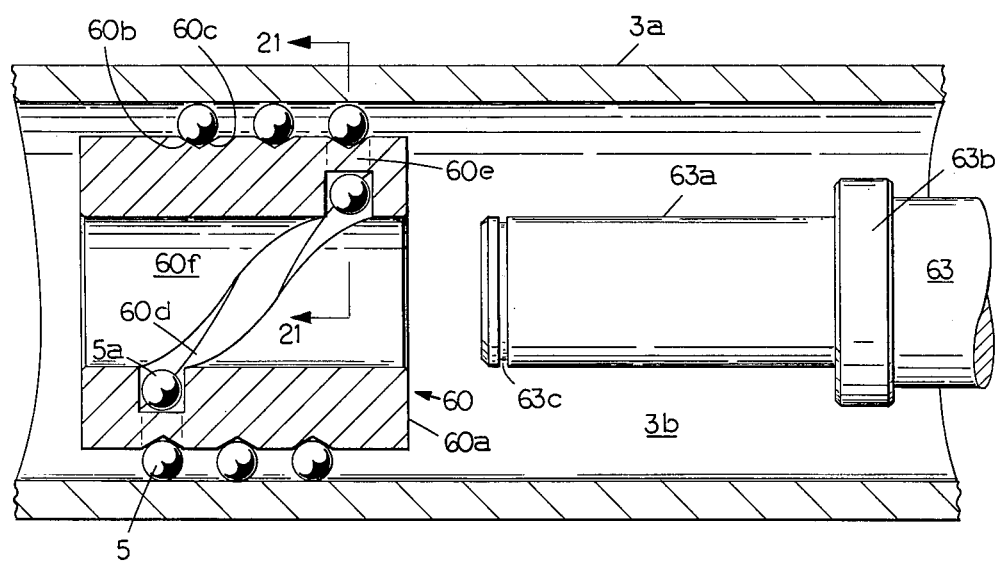
FIG. 20 is a longitudinal sectional view of an alternate embodiment of this invention for clutching a hollow cylindricay body; and, FIG. 21 is a sectional view in part taken along lines 21—21 of FIG. 20.
Figure 21:
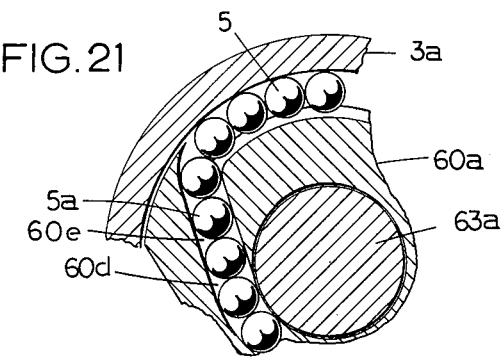

FIG. 20 shows a device of this invention to clutch a cylindrical surface from the inside. Housing 60 comprises outer housing 60a and inner housing 63. Outer housing 60a has a spiral recess extending in a helical direction around the periphery having pinch surfaces 60b and 60c. At each end of the spiral recess, passage 60e, which is part of duct 60a, conducts the balls radially inward so that the balls may circulate through the inner return duct. The action of clutch balls in pinch areas has been hereinbefore described. Inner housing 63 has extension 63a which enters bore 60f to close duct 60d. Outer housing 60a abuts flange 63b and is held on by a lockring (not shown) in groove 63c. By means previously described, the rollers of this clutch embodiment may be controlled by roller control means or flexible roller conductor belts. As previously described, individual ducts may be associated with individual helical recesses to jog the balls axially back to the individual recess in less than one turn about the surface of body 3a.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A device for transmitting forces to a first member having a cylindrical outer surface to urge the member, if it moves, to move with a preselected relationship between its axial motion and its rotational motion relative to the device comprising; a housing having an opening through which said first member extends, with its cylindrical outer surface adjacent the side wall of the opening, surface contours in the side wall of the opening describing at least one elongated recess of finite length, opening toward the cylindrical surface of said first member and extending generally in a direction describing a helix about the axis of said member, means to communicate rollers between ends of said recess or recesses, a plurality of rollers filling said recess or recesses and communicating means so that movement of rollers longitudinally in the recess or recesses causes a generally sympathetic movement of all said rollers, said recess or recesses having such surface contour that rollers moving in contact with said member may move longitudinally along said recess or recesses, but will encounter the surface of said recess or recesses and be pinched between the recess surface and the surface of said member if the roller tends to move transverse the longitudinal direction of said recess or recesses to exert a resisting force against said member if said member tends to move in a direction that will increase the pinch forces to urge said member, if it moves, to move such that said rollers will move longitudinally in said recess or recesses to urge said member, if it moves, to move with a relationship between its axial and rotational motion that is related to the recess helix angle.

2. The device of claim 1 in which said recess surface contour is such that rollers moving in one transverse direction relative to the longitudinal direction of said recess or recesses will encounter an abutment restricting farther transverse movement of said rollers, having sufficient space between the recess surface and the surface of said member so that rollers urged against the abutment will not be urged against the surface of said member to permit one-way clutching action of said rollers against said member.

3. The device of claim 1 in which the housing includes an inner member and an outer member, said recess or recesses being formed by cooperating surfaces of said inner and outer members, said inner member being movable relative to said outer member such that the space between the surfaces of said recess and the surface of said first member will change in proportion to the amount of movement of said inner member, means to move the inner member relative to the outer member, movement of said inner member that reduces space within recess serving to urge rollers against the surface of said first member, so that rollers so urged into contact with said first member will roll, if they roll, in the longitudinal direction of said recess, thereby urging said first member to move with a predetermined relationship between its rotational and axial motion.

4. The device of claim 1 in which the housing includes an inner member and an outer member, said recess being in the side wall of the outer member, the inner member having channels juxtaposed with said recess or recesses, said channels extending through the side walls of the inner member to guide said rollers as they move longitudinal of said recess such that said rollers will move with a reasonably uniform relationship to the transverse contour of said recess, said inner member being movable relative to said outer member to position said rollers within the limit of movement of said rollers in a direction transverse the longitudinal direction of said recess or recesses.

5. The device of claim 4 being further provided with means to position said inner member relative to said outer member, whereby said rollers can be positioned transversely within said recess or recesses to control the pinching action of said recess surface against said rollers and thereby control the clutching action between said rollers and said first member.

6. The device of claim 5 in which said inner member is selectively biased in one direction transverse the longitudinal direction of said recess whereby said rollers are biased into the pinch area between the recess surface and the surface of said first member if said first member tends to move in one direction, said rollers being prevented from moving into the opposite pinch area, thus being unable to clutch said first member if it moves in the opposite direction to provide a one-way clutch action.

7. The device of claim 4 further provided with means to resist motion between said inner member and said first member so that motion of said first member relative to the device will cause said inner member to be urged in the same direction relative to said outer member so that rollers between the recess surface and the surface of said first member will be urged into the pinch area of said recess by motion of said first member so that continued motion of said first member will be resisted by said rollers unless the motion of said first member is such that said rollers move longitudinally in said recess whereby said first member is urged, if it moves, to do so with a relationship betweeen axial motion and rotational motion determined by the helix angle of said recess or recesses.

8. The device of claim 1, the housing comprising an inner and outer member, the inner member at least in part consisting of at least one helical coil generally concentric with the cylindrical surface of said first member, said recess or recesses being formed by cooperating surfaces on adjacent coil loops, the transverse area between the surface of said recess and the surface of said first member thus being reduced by axial compression of said coil whereby a roller in said recess in contact with the recess surfaces will be urged against the surface of said first member by compression of said coil, said inner member and said outer member having means to prevent relative rotation therebetween.

9. The device of claim 8 in which the communication means for conducting rollers between recess ends is formed by a channel in the coil leading across the coil loop, the channel surface shaped so that the rollers in the channel will not be urged against the surface of said first member, said channel traversing the axial distance relative to the axis of said first member in a direction opposite to and in the amount of the axial distance traversed by said recess so that a roller moving lingitudinally along both recess and channel moves in a serpentine path relative to the device.

10. The device of claim 8 in which the means to communicate rollers between opposite recess ends comprises an opening at one end of each recess directed generally outward radially in the side wall of said inner member, an opening extending to the vacinity of the axially opposite end of a recess and an opening directed generally inward radially to a recess so that rollers emerging from one end of a recess are conducted to the axially opposite end of a recess when said first member moves relative to the device, causing a general circulation of said rollers.

11. The device of claim 8 in which the inner member is of such construction that it must be stretched longer axially to increase the spacing between loops of said coil so that rollers will fit within the area defined by recess surfaces and the surface of said first member, said coil having an intrinsic resilient tendency to shorten to its original undistorted shape, thereby tending to decrease the coil spacing whereby said rollers are urged against the surface of said first member to accomplish a clutching action.

12. The device of claim 8 being further provided with means to apply a force to the inner member tending to shorten the axial length of said inner member and hence to reduce the coil loop spacing so that rollers in the recess or recesses are urged toward said first member to provide a clutching action that is proportional to the force applied by means to apply a force to said inner member.

13. The device of claim 1, the housing comprising an outer member and a plurality of inner members situated between said outer member and the cylindrical surface of said first member and spaced axially along the first member, the surface of said inner members cooperating with the axially adjacent inner member to form the recesses and the means to communicate rollers between recess ends, said communication means having a longitudinal direction to conduct rollers moving therethrough an axial distance relative to said first member opposite the axial distance traversed by the recess, the inner adjacent members being movable one relative to the other to change the transverse area of said recess formed by cooperating surfaces of adjacent inner members and the surface of said first member such that by urging the inner members closer together rollers in said recesses will be urged toward the surface of said first member, and means to move said inner members each relative to the adjacent member to control the clutching action of said rollers in said recess or recesses.

14. The device of claim 13 in which means to move said inner members, each relative to adjacent inner member, comprises a resilient means to bias said inner members closer together to urge said rollers in said recesses toward the surface of said first member with a force proportional to the force exerted by said biasing means so that the clutching action between the device and said first member will be generally proportional to the biasing force.

15. The device of claim 13 in which the means to move said inner members, each relative to said adjacent inner member, comprises means to convey force from outside the device to said inner members so that the force transmitted from outside the device urges the cooperating surfaces of adjacent inner members closer together to reduce the area between the cooperating surfaces and the surface of said first member to urge rollers in said recesses toward said first member whereby said first member is clutched by the device with an effort related to the force applied by said means to convey force to said inner members.

16. The device of claim 1 being further provided with at least one flexible roller cage having a cavity for each roller in spaced relationship to other rollers situated between the housing and the cylindrical surface, the cage moving with said rollers along said recess or recesses and communication means to control the spacing of rollers, and to urge said rollers to move in a uniform path longitudinally in said recess.

17. The device of claim 1 in which said rollers are balls.

18. The device of claim 1 in which the rollers have a central rotational axis and two ends with a diminishing diameter toward the ends with a midsection between said ends of a generally cylindrical shape so that the surfaces of said rollers near the ends contact surfaces of said recess and the midsection of said rollers contacts the surface of said first member.

19. A device for transmitting forces to a first member having a cylindrical inner surface to urge the member, if it moves relative to the device, to move with a preselected relationship between its axial and its rotational motion comprising; a housing within an opening described by the inner surface of the first member having side walls adjacent the surface of the first member, the outer surface of said housing shaped to form at least one longitudinal recess opening toward the surface of said first member and extending a finite distance in a generally helical direction relative to the centerline of the cylindrical inner surface, means to communicate rollers from one end of said recess to another, a plurality of rollers generally filling said recess and communication means so that the movement of one roller along the recess causes a generally sympathetic movement of all rollers, said recess having such surface contour that rollers tending to move in at least one direction transverse the longitudinal direction of said recess will be pinched between the surface of said recess and the surface of said first member to discourage movement of said first member in a direction to increase the pinch forces on said roller, sid roller being movable in the longitudinal direction of said recess to urge said member, if it moves, to move such that said rollers in contact with the recess surface and the surface of said first member will move in the helical direction of said recess to urge said member, if it moves, to move with a predetermined relationship between its axial and its rotational motion.

20. The device of claim 19, the housing comprising an inner member and a plurality of outer members situated between the cylindrical surface of said first member and said inner member and spaced axially apart, the outer surfaces of said outer members cooperating to form said recess, said outer members being movable relative to each adjacent outer member such that the area between the recess surfaces and the surface of said first member is changed by the movement to urge rollers in the recess to move toward the surface of said first member when the movement of said outer member is such as to reduce said area, means to move said outer members to control the force transmitting action between said first member and said housing.

21. A device for transmitting forces to a first member having a cylindrical outer surface to urge the member, if it moves, to move with a predetermined and adjustable relationship between its axial and its rotational motion comprising; an outer member having an opening through which said first member extends, a plurality of inner members situated above the periphery of the cylindrical surface of said first member, said inner members having inner side wall surfaces describing at least one recess opening toward the surface of said first member extending longitudinally in a direction describing a helix about the centerline of the cylindrical surface of said first member, means to adjust and retain in selected adjustment the helix angle of said recess or recesses by movement of said inner member relative to said outer member, means to communicate rollers between recess ends, a plurality of rollers generally filling said recess and communication means so that movement of one roller longitudinally of a recess causes a generally sympathetic movement of all rollers, the surface of said recess being such that rollers may move longitudinally in the recess between the recess surface and the surface of said first member but will be pinched between the surface of said recess and the surface of said first member if said rollers move transversely in the recess to discourage movemment of said first member in the direction that increases the pinch forces on the rollers unless said first member moves such that the pinched rollers move longitudinally in said recess thus causing said first member to move, if it moves, such that the relationship between its rotational and its axial motion is proportional to the helix angle of said recess or recesses.

22. A device for transmitting forces to a first member having a cylindrical surface to urge the member, if it moves, to move with a preselected relationship between its rotational and axial motion relative to the device comprising: a housing with sidewall surfaces adjacent the cylindrical surface of said first member, surface contours in said sidewall describing at least one elongated recess having a longitudinal and a transverse dimension and opening toward said cylindrical surface, said longitudinal dimension extending generally in a direction for at least some distance along a helical path about the axis of said cylindrical surface, means to communicate rollers between ends of said recess or recesses so that rollers may endlessly circulate along said recess or recesses, said recess or recesses having such contour that rollers may move along the longitudinal dimension of said recess or recesses, but if said rollers move in at least one direction of said transverse dimension in said recess or recesses said rollers will encounter at least one confining surface area that will resist further transverse movement of said rollers and by way of said rollers will transmit tangential forces to the surface of said first member which will resist motion of said first member that tend to cause rollers to move farther in said transverse direction to urge said first member, if it moves, to move such that rollers move in a direction of said longitudinal dimension in said recess or recesses so that said first member moves, if it moves, with a relationship between its rotational and axial motion that is related to the helix angle of said helical path of said recess or recesses.

* * * * *